US007136826B2

(12) United States Patent
Alsafadi et al.

(10) Patent No.: US 7,136,826 B2
(45) Date of Patent: Nov. 14, 2006

(54) METHOD FOR CREATING PERSONALITY PROFILES USING TAGGED PHYSICAL OBJECTS

(75) Inventors: Yasser Alsafadi, Yorktown Heights, NY (US); Amr F. Yassin, Ossining, NY (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 1107 days.

(21) Appl. No.: 09/826,249

(22) Filed: Apr. 4, 2001

(65) Prior Publication Data

US 2002/0147629 A1    Oct. 10, 2002

(51) Int. Cl.
*G06F 9/44* (2006.01)
(52) U.S. Cl. .................................................. 705/10
(58) Field of Classification Search ................. 705/10; 235/375, 385; 340/568.1
See application file for complete search history.

(56) References Cited

U.S. PATENT DOCUMENTS 6,407,665 B1 *   6/2002   Maloney .................. 340/568.1
6,535,889 B1 *   3/2003   Headrick et al. .......... 707/104.1
6,571,279 B1 *   5/2003   Herz et al. ................... 709/217
6,895,406 B1 *   5/2005   Fables et al. ................ 707/102

FOREIGN PATENT DOCUMENTS

| EP | 0640938 A2 * | 8/1994 |
| WO | WO 9722106 A1 * | 6/1997 |
| WO | WO 9747135 A1 * | 12/1997 |

* cited by examiner

*Primary Examiner*—Romain Jeanty

(57) ABSTRACT

A method for creating a personality profile based upon an explicit association between icons/objects and attributes describing some of the values with which a person associates with themselves is disclosed. The person may own/acquire one or more icons/objects. The icon/objects in conjunction with labeling technology allow for accessing of object profiles. Using information from the object profiles, attributes for a personality profile are complied about the person. This personality profile projects an explicit, quantified image about the person, that could be used to tailor advertising, marketing, or other services.

22 Claims, 6 Drawing Sheets

```
<Personality-Characteristics Icon="Tennis Racket">
    <Adventure> 40 </Adventure>
    <Status> 25 </Status>
    <Wealth> 30 </Wealth>
    <Power> 15 </Power>
    <Obedience> 20 </Obedience>
    <Pleasure> 45 </Pleasure>
    <Individuality> 45 </Individuality>
    <Having-Fun> 60 </Having-Fun>
    <Excitement> 45 </Excitement>
    <Ambition> 45 </Ambition>
    <Modesty> 25 </Modesty>
    <Looking-Good> 35 </Looking-Good>
    <Health-and-Fitness> 60 </Health-and-Fitness>
    <Traditional-Gender-Roles> 15 </Traditional-Gender-Roles>
    <Courage> 45 </Courage>
    <Leisure> 35 </Leisure>
    <Enjoying-Life> 65 </Enjoying-Life>
</Personality-Characteristics>
```

FIG. 5

METHOD FOR CREATING PERSONALITY PROFILES USING TAGGED PHYSICAL OBJECTS

FIELD OF THE INVENTION

The present invention relates generally to the field of creating and using personality profiles, and more particularly to a method for associating tagged physical objects with its owner's personality.

BACKGROUND OF THE INVENTION

Physical items, memento's, nick-knacks and other personal possessions reflect upon the owner's tastes, likes and personality. For example, a person having a tennis racket or an icon of a tennis racket in their office conveys to visitors an affection or appreciation for sports. A woman driving a European car, or keeping a small model of a European car in her office may send a message of a certain status or taste. FIG. 1, shows how people may associate various objects or icons to reflect a certain image to their surroundings. Personality profiles that reflect such traits are very useful for numerous purposes, e.g., in advertising and product marketing. However, it is difficult to create such personality profiles in the virtual world. Without manually compiling this type of information, there is no direct mechanism to convert these associations to a report or an electronic database. In this regard, the inventors have realized that smart labeling technology may be used for solving this problem in accordance with embodiments of the present invention.

Smart labeling is the latest Radio frequency identification (RFID) technology, combining the advantages of barcode, Electronic Article Surveillance (EAS) and traditional RFID solutions. RFID systems allow for non-contact reading in manufacturing and other types of environments where barcode labels may not perform properly or be practical. RFID has applications in a wide range of markets including automated vehicle identification (AVI) systems and livestock identification because of its capability to track moving objects. The technology has become a primary player in identification, automated data collection, and analysis systems worldwide.

For example, Philips Semiconductors' ICODE ICs represent the state-of-the-art in smart label technology, offering a low-cost, reprogrammable and disposable solution for source tagging, automatic data capture, theft protection and data storage on a product or its packaging. ICODE smart labels allow for almost any item to be tagged for efficient handling. ICODE's highly automated item scanning process does not require line-of-sight and can scan multiple labels at the same time.

In airline baggage tagging and parcel services, smart labels offer considerable advantages in sorting and item tracking. In supply chain management systems, smart labels overcome the limitations of barcode technology, providing improved product distribution; and in libraries and rental applications, they provide automated check-in, check-out and inventory control.

As shown in FIG. 2, a conventional RFID system 10 consists of a tag reader 11 which is connected to a personal computer 12 (PC) through a serial port 13. The PC 12 takes action as it reads the trigger of a tag 14. Information can be exchanged via a communication medium 15 (e.g., Internet or Intranet) with a remote server 16.

The tag reader 11 typically consists of three components:
An antenna or coil;
A transceiver (with decoder); and
A transponder (commonly called an RF tag) that is electronically programmed with unique information.

The antenna emits radio signals to activate the tag so that it can read and write data to it. The antenna is the conduit between the tag and the transceiver. It helps control the system's data acquisition and communication. The electromagnetic fields produced by the antenna can be constantly present or activated as needed when tags are detected by a sensor.

There is a need, however, for a method using state of the art technology to solve the shortcomings described above. The inventors have discovered significant advantages in using various labeling technologies in facilitating the creation of personality profiles as discussed below.

SUMMARY OF THE INVENTION

People use icons around them to reflect their values, aspirations, and ambitions. These icons reflect part of its owner's personality implicitly. One aspect of the invention provides a method for an explicit association between the icon and the attributes describing some of the values with which a person associates with themselves. Using the attributes a personality profile is constructed about this person. This personality profile projects an explicit, quantified image about the person, that could be used to tailor advertising, marketing, or other services.

One embodiment of the invention is directed to a method for creating a profile related to a person. The method includes the steps of identifying at least one object or icon associated with the person, receiving information related to the object or icon via a tag, accessing an object profile in accordance with the information received from the tag and accessing a unique profile associated with the person. The method then modifies the unique profile in accordance with the object profile.

In another embodiment, the requests sent by the apparatus and the responses from the information interface are formatted as XML documents.

Another embodiment of the invention relates to a memory medium containing code to create a personality profile.

These and other features and advantages of the present invention will become more apparent from the accompanying drawings and the following detailed description.

BRIEF DESCRIPTION OF THE DRAWINGS

FIG. 5 show an example of a personality profile document in accordance with one embodiment of the present invention.

DETAILED DESCRIPTION OF THE INVENTION

Figure 1:
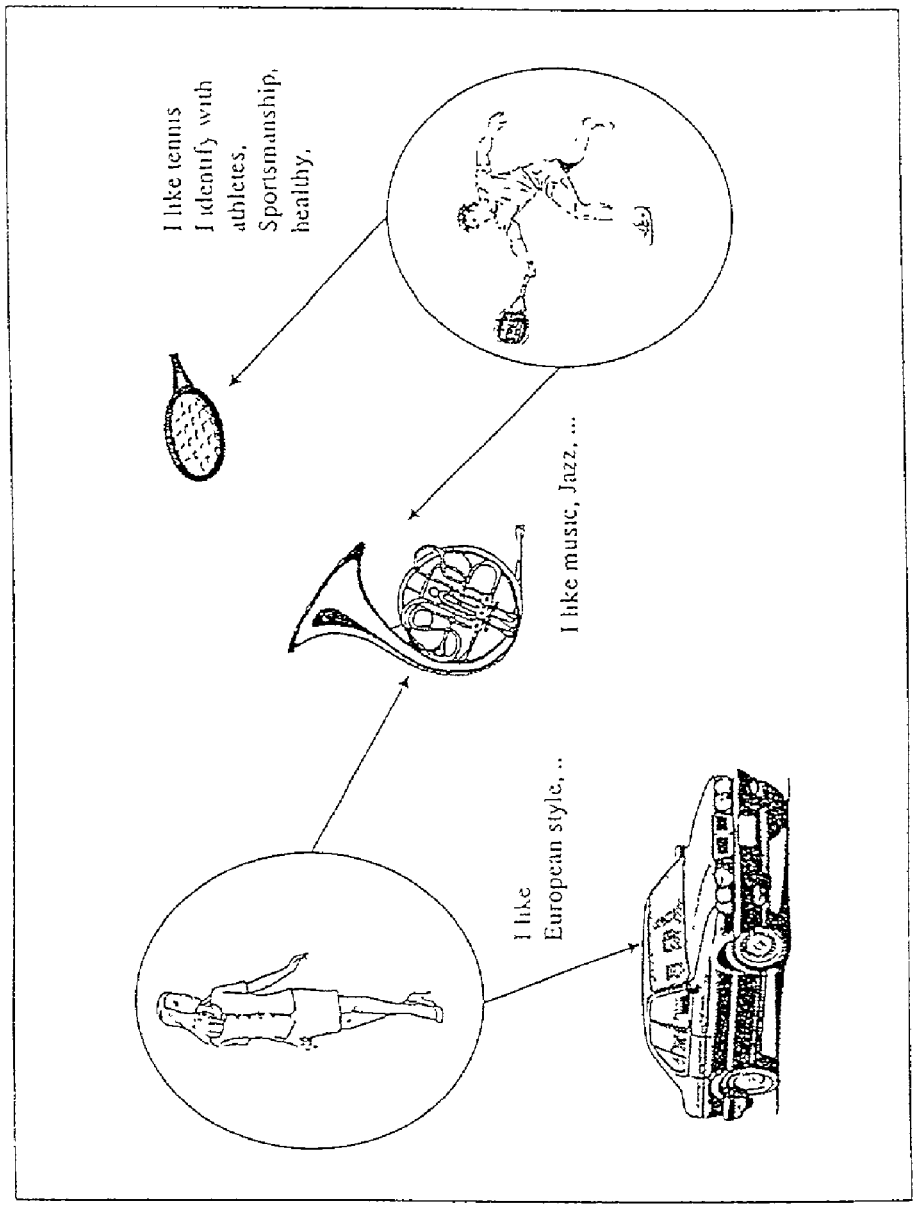
FIG. 1 shows an example of how an icon/object may be associated with certain personality traits or preferences.
Figure 2:
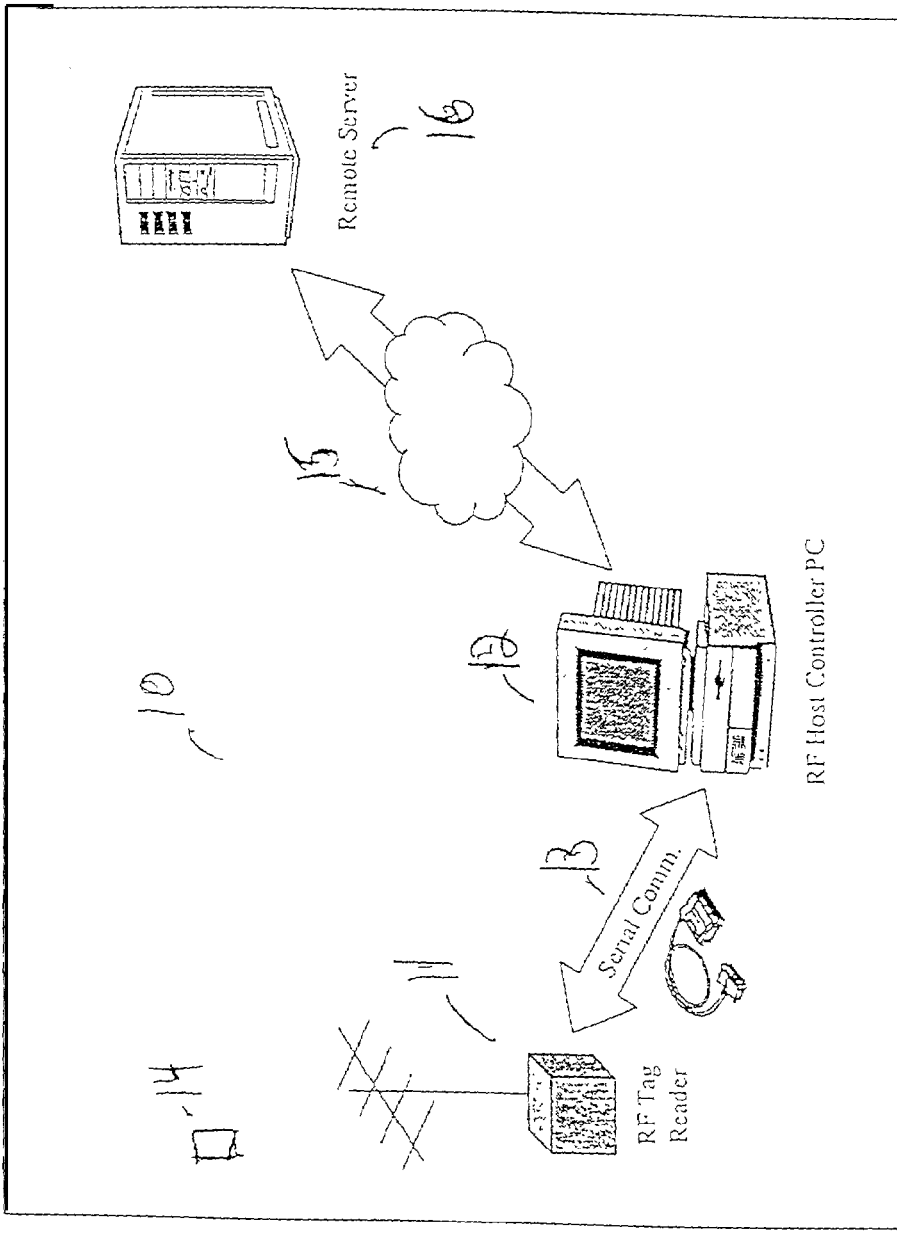
FIG. 2 is a conventional RFID system.
Figure 3:
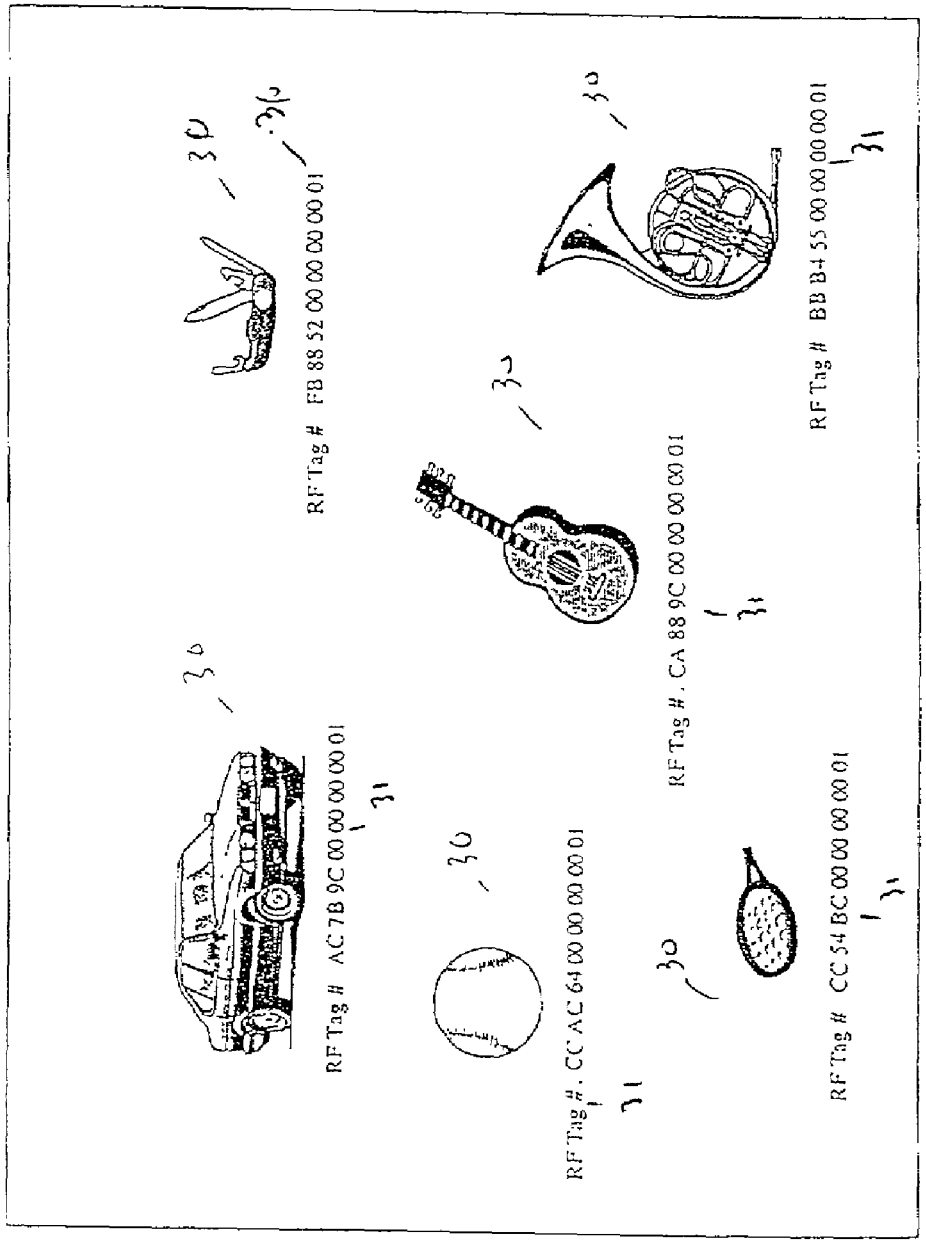
FIG. 3 illustrates the association of an icon/object with a tag.

FIG. 3 shows a preferred embodiment of the invention, in which numerous objects 30 have respective tags 31 associated therewith. The objects 30 can be miniaturized icons, toys, figurines, pin-buttons, or any physical object. The types of objects 30 shown in FIG. 3 are merely illustrative and not meant to be limiting. The tags 31 can be integrated, embedded, coupled or temperately associated with the objects 30. The invention is not limited to RF tags, other types of information tags may be used, e.g., barcodes. Also, the tag does not necessarily need to be attached to the object 30, but only read when the object is first purchased.

Figure 4:
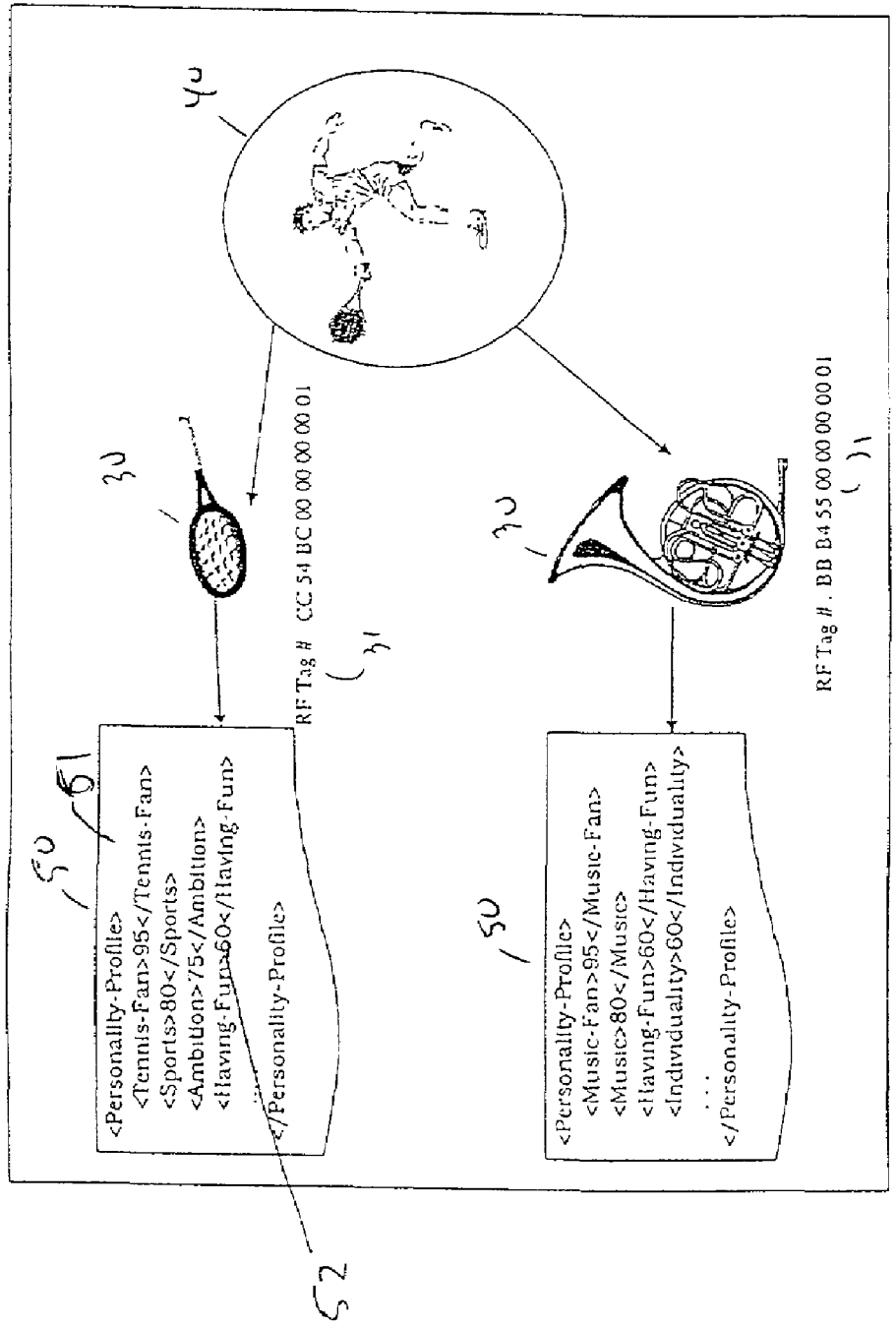
FIG. 4 illustrates the association of a tag with a personality profile.

The objects 30, via information associated with the tags 31, reflect upon the owner of the object 30. For example, as shown in FIG. 4, two objects 30 (e.g., a tennis racket and a musical instrument) are associated/owned by a person 40. The respective tags 31 (embedded/coupled to the objects 30) are associated with respective documents/profiles 50. The document/profile 50 contains information 51 that reflects upon the values, habits, traits and/or personal aspirations of the object's 30 owner.

The information, as shown in FIG. 4, contains an indicator 52 for the value, habit, trait, etc of the person 40. These indicators 52 are predefined for the object 30. This may be done through the use of consumer surveys, market research and public opinion polls.

Preferably, the document/profile 50 and is expressed using Extensible Markup Language (XML). This facilitates transfer and access of the document/profile 50 over the Internet.

(XML) is fast becoming the dominant language for describing content delivered over the Internet. The XML standard describes a class of data objects called XML documents and the behavior of computer programs which process such documents. XML documents are made up of storage units called entities, which contain either parsed or unparsed data. Parsed data is made up of characters, some of which form character data, and some of which form markup. Markup for a given XML document encodes a description of the storage layout and logical structure of that document. XML provides a mechanism to impose constraints on the storage layout and logical structure. Additional details regarding conventional XML may be found in XML 1.0 (Second Edition), World Wide Web Consortium (W3C) Recommendation, October 2000, www. w3.org/TR/REC-xml, which is incorporated by reference herein.

As shown in FIG. 5, a personality profile 53 is created based upon a compilation of the objects 30 owned/associated with a person. One or more of a plurality of weighted values 54 are adjusted (i.e., up or down) based upon identifiers 52 associated with the objects 30 that the person 40 identifies himself with. The weighted values 54 in the personality profile 53 depict a correlation percentage associating the object 30 with those social values, habits, or interests.

The personality profile 53 reflects the person's 40 personality characteristics. The personality profile 53 may also be used to indicate the types of possessions the person 40 owns, where they shop, the time/dates that they shop, the location the person 40 visits.

Preferably, the personality profile 53 is an XML document. FIG. 5 is an example of such an XML document.

Figure 6:
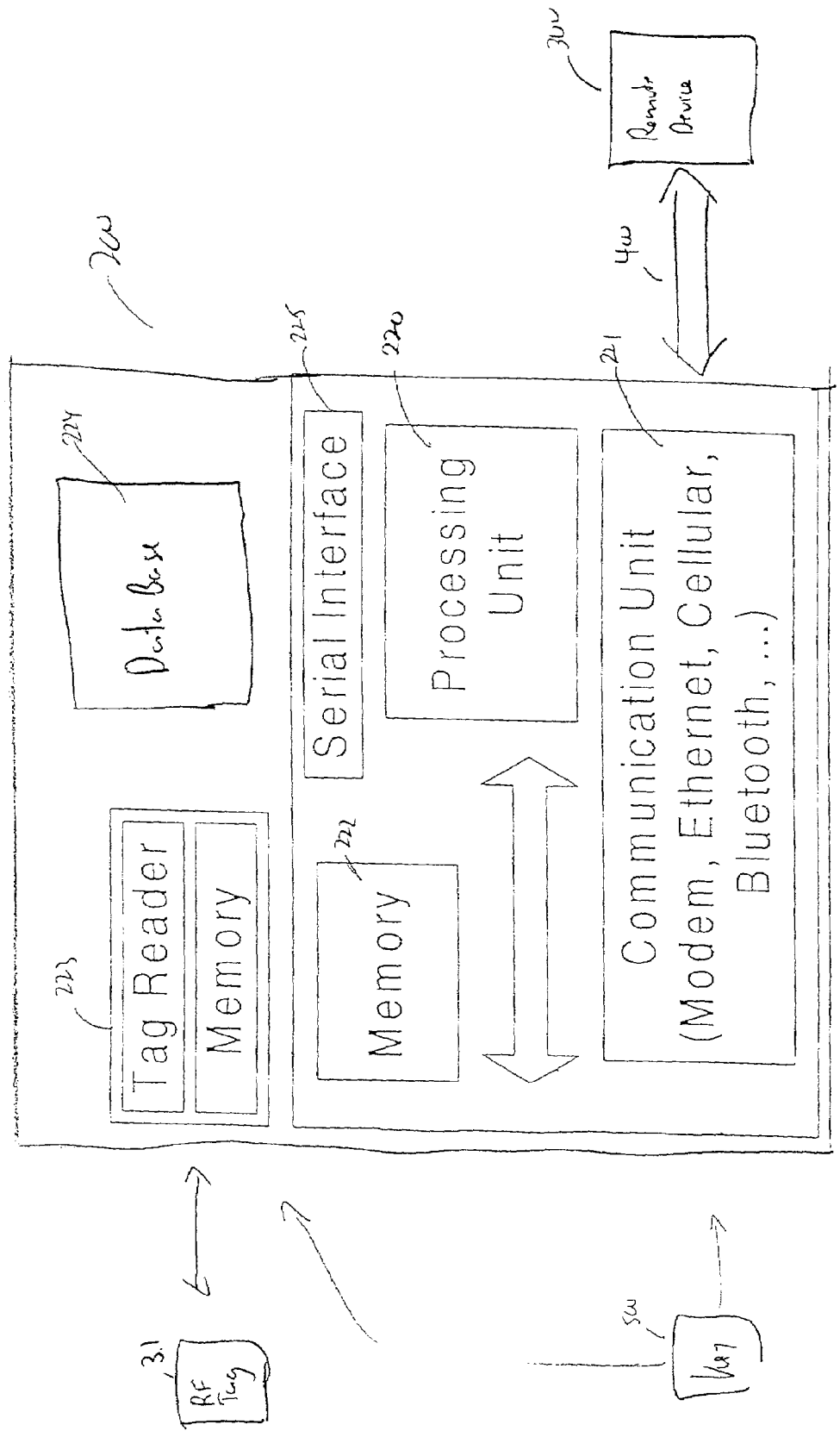
FIG. 6 is a block diagram of an exemplary acquisition and profile storage apparatus in accordance with another embodiment of the invention.

FIG. 6 shows an example of a hardware design for an personality profile acquisition device 200 in accordance with one embodiment of the invention. The device 200 may be, for example, a cellular phone, personal computer (PC), a point-of-sale terminal at a retail store, a personal digital assistant (PDA), a toll booth machine, a vending machine or the like.

In this example, the device 200 includes a processor 220 and a memory 222. The processor 220 may represent, e.g., a microprocessor, a central processing unit, a computer, a circuit card, an application-specific integrated circuit (ASICs). The memory 222 may represent, e.g., disk-based optical or magnetic storage units, electronic memories, as well as portions or combinations of these and other memory devices. The device 200 may also include a database 224 which stores one or more of the personality profiles 53 as well as the document/profiles 50 related to respective objects 30.

As shown, the device 200 also includes a communication unit 221 (e.g. Ethernet, Bluetooth, cellular or packet data interface) and a tag reading unit 223. The tag reading unit 223 may be internal to the device 200 in which the unit 223 appears as part of the memory space of the device 200 or an external reading unit can be accessed via an interface, e.g., serial interface 225. Preferably, the tag reading unit 223 is an RFID type reader, but other types of tag/identity generation/reading mechanisms may be used, e.g., a barcode reader.

The device 200 can communicate to one or more remote devices 300 over a network 400. For example, the Internet may be accessed by the device 200 through wired connections, wireless connections or combinations thereof, using well-known conventional communication protocols such as the Internet Protocol (IP).

In operation, the device 200 receives/reads information from the tags 31. The tags 31 may be active or passive. The document/profile 50 associated with the RF tag 31 is accessed. This may be directly from the database 224 or information accessed from the remote device 300. It is also noted that unique identification numbers stored in the tags 31 (as shown in FIG. 3) can be used as primary keys to accessing appropriate data in the database 224.

A key 500 is also entered/received which uniquely identifies the person 40 via the tag reader 223, serial interface 225 or communication unit. For example, the key 500 may be a credit card number, a social security number, voice print of the person 40, a vehicle identification number (VIN) from the person's 40 automobile or even a unique random number associated with the person 40. Based upon the key 50, the unique personality profile 53 for the person 40 is accessed/updated or a new one is created. The person 40 may or may not know that the key has been entered.

An advantage of the embodiment shown in FIG. 6 is that a wide variety of system architectures can be used to implement acquisition and compilation of the personality profiles 53. Server-side and client-side architectures can be used. As briefly mention above, the remote device 300 may be a web server, a processing center or other database coupled to the device 200 over the Internet or other communication network. The network 400 may represent a global computer communications network such as the Internet, a wide area network, a metropolitan area network, a local area network, a cable network, a satellite network or a telephone network, as well as portions or combinations of these and other types of networks. The device 200 and the remote device 300 may themselves be respective server and client machines coupled to the network 400.

The database 224 may be integrated with the device 200 or external. The database 224 may be accessed by others to use the personality profiles 53 for advertising, marketing, research or other similar activities as needed.

The functional operations associated with the device 200, as described above, may be implemented in whole or in part in one or more software programs stored in the memory 222 and executed by the processor 220.

While the present invention has been described above in terms of specific embodiments, it is to be understood that the invention is not intended to be confined or limited to the embodiments disclosed herein. On the contrary, the present invention is intended to cover various structures and modifications thereof included within the spirit and scope of the appended claims.

What is claimed is:

1. A method for updating a unique profile related to a person, said method making use of at least one physical object associated with the person and having a tag containing optically encoded or electronically stored information concerning the physical object, said method comprising the steps of:
    retrieving said optically encoded or electronically stored information related to the physical object from said tag;
    electronically accessing an object profile in accordance with the information retrieved from the tag;
    electronically accessing a unique profile associated with the person; and
    modifying the unique profile in accordance with the object profile.

2. The method as claimed in claim 1, wherein said method further comprises the steps of:
    receiving a key to facilitate accessing the unique profile.

3. The method as claimed in claim 2, wherein the key is credit card number, a social security number, a voice print, a vehicle identification number (VIN) or a unique random number.

4. The method as claimed in claim 1, wherein the object profile includes at least one identifier, and wherein the unique profile includes a plurality of adjustable values.

5. The method as claimed in claim 4, wherein the modifying step includes adjusting the adjustable values based upon the at least one identifier.

6. The method as claimed in claim 1, wherein the unique profile reflects the personal tastes, social values, habits, or interests of the person.

7. The method as claimed in claim 1, wherein the physical object is a miniaturized icon, a toy, a figurine, a pin-button, or an item owned by the person.

8. The method as claimed in claim 7, wherein the tag is integrated, embedded, coupled or temperately associated with the physical object.

9. The method as claimed in claim 1, wherein the object profile and the unique profile comprise XML documents.

10. The method as claimed in claim 1, wherein the object profile and the unique profile are stored in one or more databases that are accessed via a communication network.

11. The method as claimed in claim 1, wherein the tag comprises an RFID or barcode tag.

12. A memory medium including code for causing a processor reading the code to modify a unique profile related to a person using information, said processor making use of at least one physical object associated with the person and having a tag containing optically encoded or electronically stored information concerning the physical object, the code causing the processor to:
    retrieve information related to the physical object from the tag;
    access an object profile in accordance with the information received from the tag;
    access a unique profile associated with the person; and
    modify the unique profile in accordance with the object profile.

13. The memory medium as claimed in claim 12, wherein said code further causes the processor to receive a key to facilitate accessing the unique profile.

14. The memory medium as claimed in claim 13, wherein the key is credit card number, a social security number, a voice print, a vehicle identification number (VIN) or a unique random number.

15. The memory medium as claimed in claim 12, wherein the object profile includes at least one identifier, and the unique profile includes a plurality of adjustable values.

16. The memory medium as claimed in claim 15, wherein the code causes the processor to adjust the adjustable values based upon the at least one identifier.

17. The memory medium as claimed in claim 12, wherein the unique profile reflects the personal tastes, social values, habits, or interests of the person.

18. The memory medium as claimed in claim 12, wherein the physical object is a miniaturized icon, a toy, a figurine, a pin-button, or a physical item owned by the person.

19. The memory medium as claimed in claim 18, wherein the tag is integrated, embedded, coupled or temperately associated with the physical object.

20. The memory medium as claimed in claim 12, wherein the object profile and the unique profile comprise XML documents.

21. The memory medium as claimed in claim 12, wherein the object profile and the unique profile are stored in one or more databases that are accessed via a communication network.

22. The memory medium as claimed in claim 12, wherein the tag comprises an RFID or barcode tag.

* * * * *